(12) United States Patent
Scherpa et al.

(10) Patent No.: US 9,354,790 B2
(45) Date of Patent: May 31, 2016

(54) DYNAMICALLY SELECTING AND ORDERING FACETS AND FACET VALUES IN A USER INTERFACE BASED ON USER PREFERENCE

(71) Applicant: International Business Machines Corporation, Armonk, NY (US)

(72) Inventors: Josef Scherpa, Fort Collins, CO (US); Andrew L. Schirmer, Andover, MA (US); Ethan L. Perry, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/740,421

(22) Filed: Jan. 14, 2013

(65) Prior Publication Data

US 2014/0201647 A1 Jul. 17, 2014

(51) Int. Cl.
G06F 3/0484 (2013.01)
G06F 3/048 (2013.01)
(52) U.S. Cl.
CPC ............ G06F 3/04842 (2013.01); G06F 3/048 (2013.01)
(58) Field of Classification Search
CPC ................ G06F 9/4443; G06F 3/0481; H04L 29/08072; H04N 21/4532; G06Q 10/10
See application file for complete search history.

(56) References Cited

U.S. PATENT DOCUMENTS

| 7,325,201 | B2 * | 1/2008 | Ferrari et al. ................. 715/737 |
| 8,024,656 | B2 | 9/2011 | Behnen et al. |
| 8,214,345 | B2 | 7/2012 | Torres et al. |
| 2007/0118542 | A1 * | 5/2007 | Sweeney ........... G06F 17/30705 |
| 2008/0244433 | A1 * | 10/2008 | Behnen et al. ................. 715/771 |
| 2009/0265373 | A1 * | 10/2009 | Acevedo-Aviles G06F 17/30625 |
| 2010/0241624 | A1 * | 9/2010 | Ramsey ............ G06F 17/30696 707/732 |
| 2010/0293074 | A1 * | 11/2010 | Schmidt ......................... 705/27 |
| 2011/0302170 | A1 * | 12/2011 | Holostov ........... G06F 17/30867 707/740 |
| 2011/0320454 | A1 | 12/2011 | Hill et al. |
| 2012/0159301 | A1 * | 6/2012 | Ramamurthy et al. ....... 715/227 |
| 2012/0173521 | A1 * | 7/2012 | Lam ............................. 707/734 |
| 2012/0226681 | A1 * | 9/2012 | Paparizos ............ G06F 17/3053 707/723 |
| 2012/0278321 | A1 | 11/2012 | Traub et al. |

(Continued)

OTHER PUBLICATIONS

Author: Zhong Title: A Personalized facet-weight based ranking method for service component retrieval Year: 2011.*

(Continued)

*Primary Examiner* — Jeffrey A Gaffin
*Assistant Examiner* — Mandrita Brahmachari
(74) *Attorney, Agent, or Firm* — Robert A. Voigt, Jr.; Winstead, P.C.

(57) ABSTRACT

A method, system and computer program product for dynamically selecting and ordering facets and/or facet values in a user interface. A user's "preference" concerning the selection and ordering of facets and/or facet values that the user desires to be displayed in the user interface is determined. Such user's preference may be determined based on monitoring the actions of the user (e.g., online activity) as well as possibly other types of information, such as the user's input and context of the user's faceted search. Upon determining the user's preference, facets and/or facet values are selected and ordered based on the user's preference and consequently displayed in the user's user interface. In this manner, the user is provided a more relevant and insightful perspective on the data set as the user sees the "best" information more quickly while performing less work to see and apply the facets and/or facet values.

8 Claims, 3 Drawing Sheets

(56) References Cited

U.S. PATENT DOCUMENTS

2012/0324367 A1* 12/2012 Ilyas ............... G06F 17/30731
715/747
2013/0036137 A1* 2/2013 Ollis ............... G06F 17/30864
707/771

OTHER PUBLICATIONS

Author: IBM Title: Graphical Method for Facet refinement in search applications Date: Apr. 21, 2009.*
Betts et al., "Getting Started with Xapian 0.1 Documentation," http://getting-started-with-xapian.readthedocs.org/en/latest/xapian-core-rst/facets.htm; 2012.
"WebSphere Commerce Database Table: FACET," http://pic.dhe.ibm.com/infocenter/wchelp/v7r0m0/index.jsp?topic=%2Fcom.ibm.commerce.database.doc%2Fdatabase%2Ffacet.htm, 2012.
Das et al., "Ordering the Attributes of Query Results," SIGMOD 2006, Jun. 27-29, 2006.
"Subject: Facet Results in Order of Rank—MSG#00837," http://osdir.com/ml/solr-user.lucene.apache.org/2009-04/msg00837.html; 2012.
"Specifying a Selection Sort Order," ATG Merchandising User Guide, http://docs.oracle.com/cd/E23507_01/Platform.20073/ATGMerchandisingUserGuide/html/s1105specifyingaselectionsortorder01.html; 2012.
Office Action for U.S. Appl. No. 14/063,515 dated Oct. 20, 2014, pp. 1-16.
Office Action for U.S. Appl. No. 14/063,515 dated Mar. 3, 2015, pp. 1-18.
Zhong et al., "A Personalized Facet-Weight based Ranking Method for Service Component Retrieval," Computing and Informatics, vol. 30, 2011, pp. 491-511.
IBM, "Graphical Method for Facet Refinement in Search Applications," IP.com No. 000181964, Apr. 21, 2009, pp. 1-3.
Office Action for U.S. Appl. No. 14/063,515 dated Nov. 19, 2015, pp. 1-19.

* cited by examiner

DYNAMICALLY SELECTING AND ORDERING FACETS AND FACET VALUES IN A USER INTERFACE BASED ON USER PREFERENCE

TECHNICAL FIELD

The present invention relates generally to faceted searches, and more particularly to dynamically selecting and ordering facets and facet values in a user interface based on user preference.

BACKGROUND

A faceted search is a technique for accessing information organized according to a faceted classification system, allowing users to explore a collection of information by applying multiple filters. A faceted classification system classifies each information element along multiple explicit dimensions, enabling the classifications to be accessed and ordered in multiple ways rather than in a single, pre-determined, taxonomic order.

For example, a faceted classification system may be applied to the ordering and displaying of songs from a music storage device. For instance, the music stored in the music storage device could be displayed to the user via a user interface (music player interface) as a simple list of song titles. However, it helps the user to select a song to listen to if other properties, such as which songs belong to which album, which albums are by which musician, etc., were displayed to the user. Each item (e.g., song) in the data set (e.g., music stored in the music storage device) has a number of properties, such as artist, album, song title, duration, genre, etc. Furthermore, each property (e.g., artist) may have one or more values (e.g., Garth Brooks, Linkin Park). In a database of items, each property may be referred to as a "facet" of the data and each property instance may be referred to as a "facet value" or "constraint."

Currently, the facets and the facet values that are displayed to the user via a user interface are typically presented in a static order. For example, the facets may be statically listed alphabetically. Often, the facets and facet values are displayed based on what the developer deems to be appropriate. For instance, referring to the music player interface discussed above, the developer of the music player interface may decide that it is better to list the album facet before the song length facet. Such an order of the facets will be displayed to all the users since the order is coded into the interface. However, such an order of the facets may not be desired by the particular user in question. Similarly, the facet values may be ordered in a particular manner as determined by the developer, such as by descending order. Again, such an order of the facet values will be displayed to all the users which may not be desired by the particular user in question.

Furthermore, by having the order of the facets and facet values displayed in the user interface determined by the developer of the user interface, the greater the number of facets and facet values displayed, the greater the effort is required on the part of the user to understand the choices available to the user and the longer it takes for the user to find the choices the user wants to apply.

In order to compensate for this problem, some of the user interfaces allow the user to have some control over the visibility and order of the facets. However, the display of the facets and facet values in the user interface is still static and stays as the user ordered it.

Such a solution may be acceptable in small data sets; however, most modern database applications, such as online shopping, involve the presentation of many different data sets simultaneously, each of which may include a large number of facets. For example, a user searching online for cleaning products may encounter a search result data set that contains dish brushes, vacuum cleaners, etc., each of which may include some common as well as different facets. The facets for such a result could be large and complex. In such cases, user control of the facets displayed in the user interface is manually performed thereby making it difficult and inefficient. Furthermore, keeping a static order of the facets and facet values overwhelms the user with choices, many of which are irrelevant to the particular user in question, and greatly slows the user's ability to navigate, refine and select particular database objects.

BRIEF SUMMARY

In one embodiment of the present invention, a method for dynamically selecting and ordering facets and/or facet values in a user interface comprises determining a preference of a user concerning a selection and order of facets and/or facet values. The method further comprises selecting facets and/or facet values based on the preference of the user. Additionally, the method comprises determining an order of the selected facets and/or facet values to be displayed in a user interface of the user based on the preference of the user. In addition, the method comprises displaying, by a processor, the selected facets and/or facet values in the user interface of the user in the determined order.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for dynamically selecting and ordering facets and/or facet values in a user interface. In one embodiment of the present invention, the user's "preference" concerning the selection and ordering of facets and/or facet values that the user desires to be displayed in the user interface is determined. The user's preference is determined based on various types of information that may be provided from outside the context of the user interface as well as within the context of the user interface, such as actions of the user (e.g., online activity) that are monitored as well as possibly other types of information, such as the user's input and the context of the user's faceted search. Upon determining the user's preference concerning the selection and ordering of facets and/or facet values that the user desires to be displayed in the user interface, facets and/or facet values are selected based on the user's preference. An order of the selected facets and/or facet values to be displayed in the user interface of the user is determined based on the user's preference. The selected facets and/or facet values are then displayed in the user interface of the user in the determined order. In this manner, the user is provided a more relevant and insightful perspective on the data set as the user sees the "best" information more quickly while performing less work to see and apply the facets and/or facet values (e.g., the user does not have to perform as much scrolling to understand the facets and/or facet values displayed in the user interface).

It is noted that the principles of the present invention discussed herein may be applied to any faceted browsing user interface, a list or other types of faceted data sets. Furthermore, the principles of the present invention may be applied to any interface that displays multiple facets and optionally multiple facet values. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
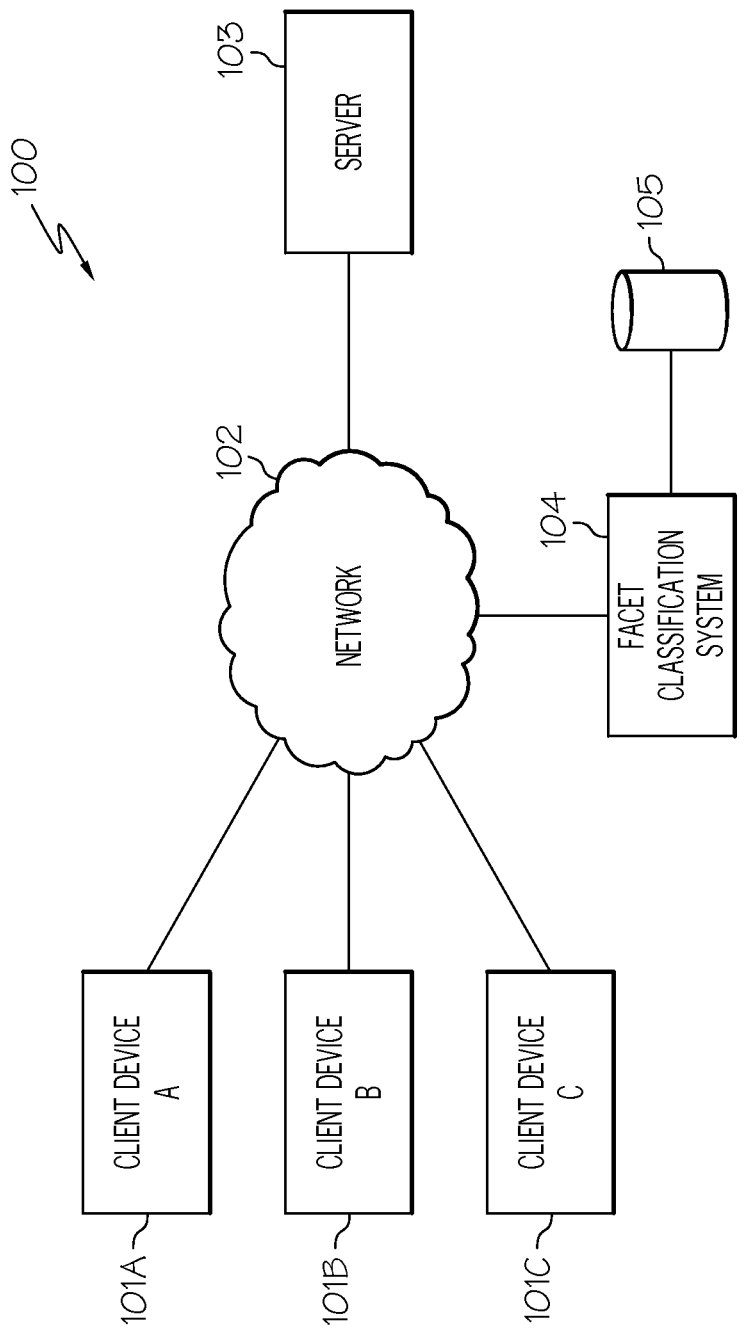
FIG. 1 illustrates a network system configured in accordance with an embodiment of the present invention.

Referring now to the Figures in detail, FIG. 1 illustrates a network system 100 configured in accordance with an embodiment of the present invention. Referring to FIG. 1, network system 100 includes a community of users using client devices 101A-101C (identified as "Client Device A," "Client Device B," and "Client Device C," respectively, in FIG. 1) to be involved in network system 100. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to other client devices 101, server 103 or facet classification system 104 via network 102.

Client devices 101 may participate in the network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a server 103, which may be a web server configured to host websites. Server 103 may also be a social network server configured with the capability of offering social networking and/or microblogging services, enabling users of client devices 101 to send and read other users' posts.

System 100 further includes a facet classification system 104 connected to network 102 by wire or wirelessly. Facet classification system 104 is configured to dynamically present facets and facet values in a particular order in the user interface of client device 101 based on the determined "preference" of the user of client device 101 as discussed further below. In connection with dynamically presenting facets and facet values in the user interface of client device 101, facet classification system 104 monitors the actions of the user of client device 101, such as monitoring the interactions of the user with other people, documents and data, online activity of the user, etc. The activities monitored by facet classification system 104 include any activity that may be used to determine the facets and/or facet values that are deemed to be "important" or "preferred" by the user to be presented to the user interface of client device 101. A description of the hardware configuration of facet classification system 104 is provided below in connection with FIG. 2.

Furthermore, system 100 includes a database 105 connected to facet classification system 104. Database 105 is configured to store a data set of information, where each item of data has a number of properties, referred to herein as "facets," and each property has one or more values, referred to herein as "facet values." Furthermore, database 105 may be configured to store user profiles for the users of client devices 101. A user profile may store the information obtained from monitoring the user's actions as discussed above, such as the user's purchase history (e.g., online purchase history) and shopping characteristics (e.g., shopping for film cameras as opposed to digital cameras). Furthermore, the user profile may store the user's preference concerning the selection and ordering of facets and/or facet values, where such information is directly inputted by the user.

System 100 is not to be limited in scope to any one particular network architecture. System 100 may include any number of clients 101, networks 102, servers 103, facet classification systems 104 and databases 105. Furthermore, in one embodiment, facet classification system 104 may be part of server 103.

Figure 2:
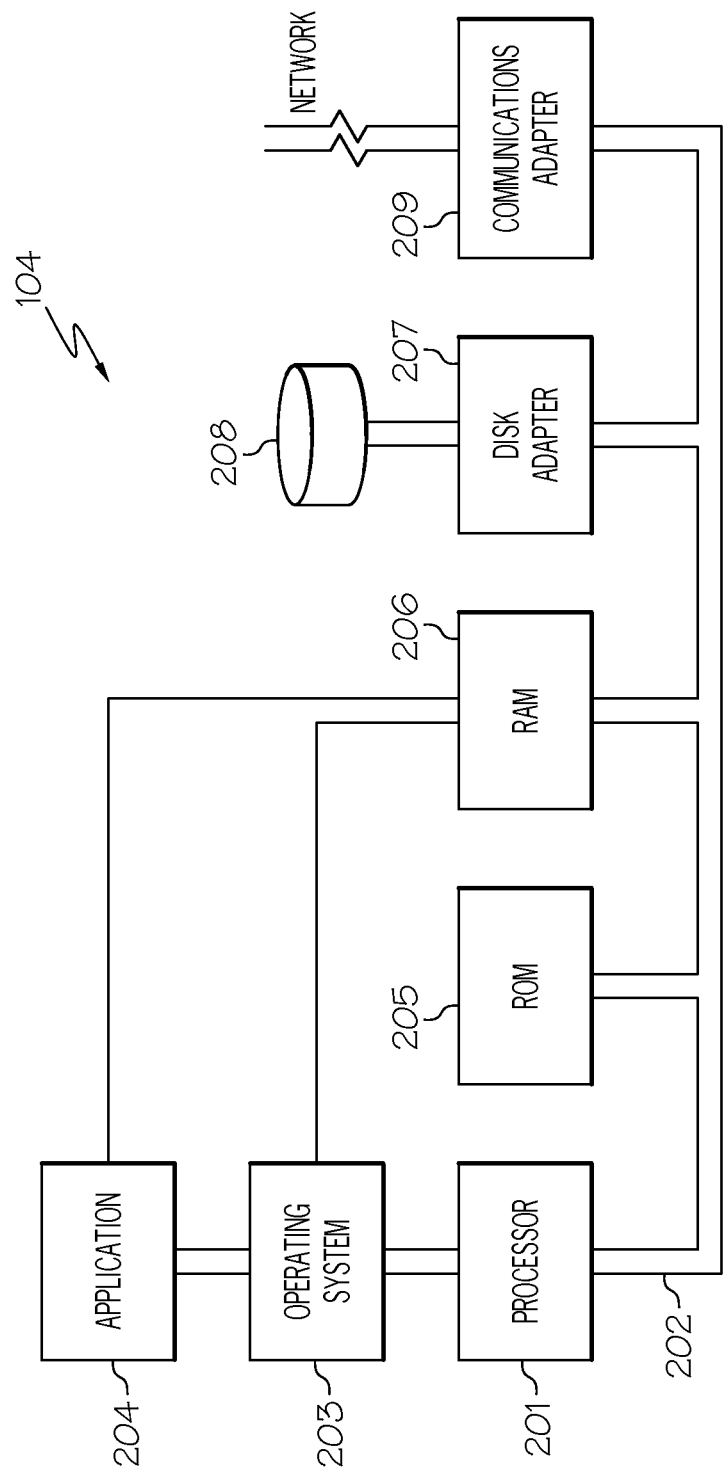
FIG. 2 illustrates a hardware configuration of a facet classification system configured in accordance with an embodiment of the present invention.

Referring now to FIG. 2, FIG. 2 illustrates a hardware configuration of a facet classification system 104 (FIG. 1) which is representative of a hardware environment for practicing the present invention. Referring to FIG. 2, facet classification system 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for dynamically selecting and ordering facets and/or facet values in the user interface of client device 101 (FIG. 1) based on the determined "preference" of the user of client device 101, as discussed further below in association with FIG. 3.

Referring again to FIG. 2, read-only memory ("ROM") 205 is coupled to system bus 202 and includes a basic input/ output system ("BIOS") that controls certain basic functions of facet classification system 104. Random access memory ("RAM") 206 and disk adapter 207 are also coupled to system bus 202. It should be noted that software components including operating system 203 and application 204 may be loaded into RAM 206, which may be facet classification system's 104 main memory for execution. Disk adapter 207 may be an integrated drive electronics ("IDE") adapter that communicates with a disk unit 208, e.g., disk drive. It is noted that the program for dynamically selecting and ordering facets and/or facet values in the user interface of client device 101 based on the determined "preference" of the user of client device 101, as discussed further below in association with FIG. 3, may reside in disk unit 208 or in application 204.

Facet classification system 104 may further include a communications adapter 209 coupled to bus 202. Communications adapter 209 interconnects bus 202 with an outside network (network 102) thereby allowing facet classification system 104 to communicate with client devices 101 as well as to monitor the actions of the users of client devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, by having the order of the facets and facet values displayed in the user interface determined by the developer of the user interface, the greater the number of facets and facet values displayed, the greater the effort is required on the part of the user to understand the choices available to the user and the longer it takes for the user to find the choices the user wants to apply. As a result, some of the user interfaces allow the user to have some control over the visibility and order of the facets. However, the display of the facets and facet values in the user interface is still static and stays as the user ordered it. Such a solution may be acceptable in small data sets; however, most modern database applications, such as online shopping, involve the presentation of many different data sets simultaneously, each of which may include a large number of facets. For example, a user searching online for cleaning products may encounter a search result data set that contains dish brushes, vacuum cleaners, etc., each of which may include some common as well as different facets. The facets for such a result could be large and complex. In such cases, user control of the facets displayed in the user interface is manually performed thereby making it difficult and inefficient. Furthermore, keeping a static order of the facets and facet values overwhelms the user with choices, many of which are irrelevant to the particular user in question, and greatly slows the user's ability to navigate, refine and select particular database objects.

Figure 3:
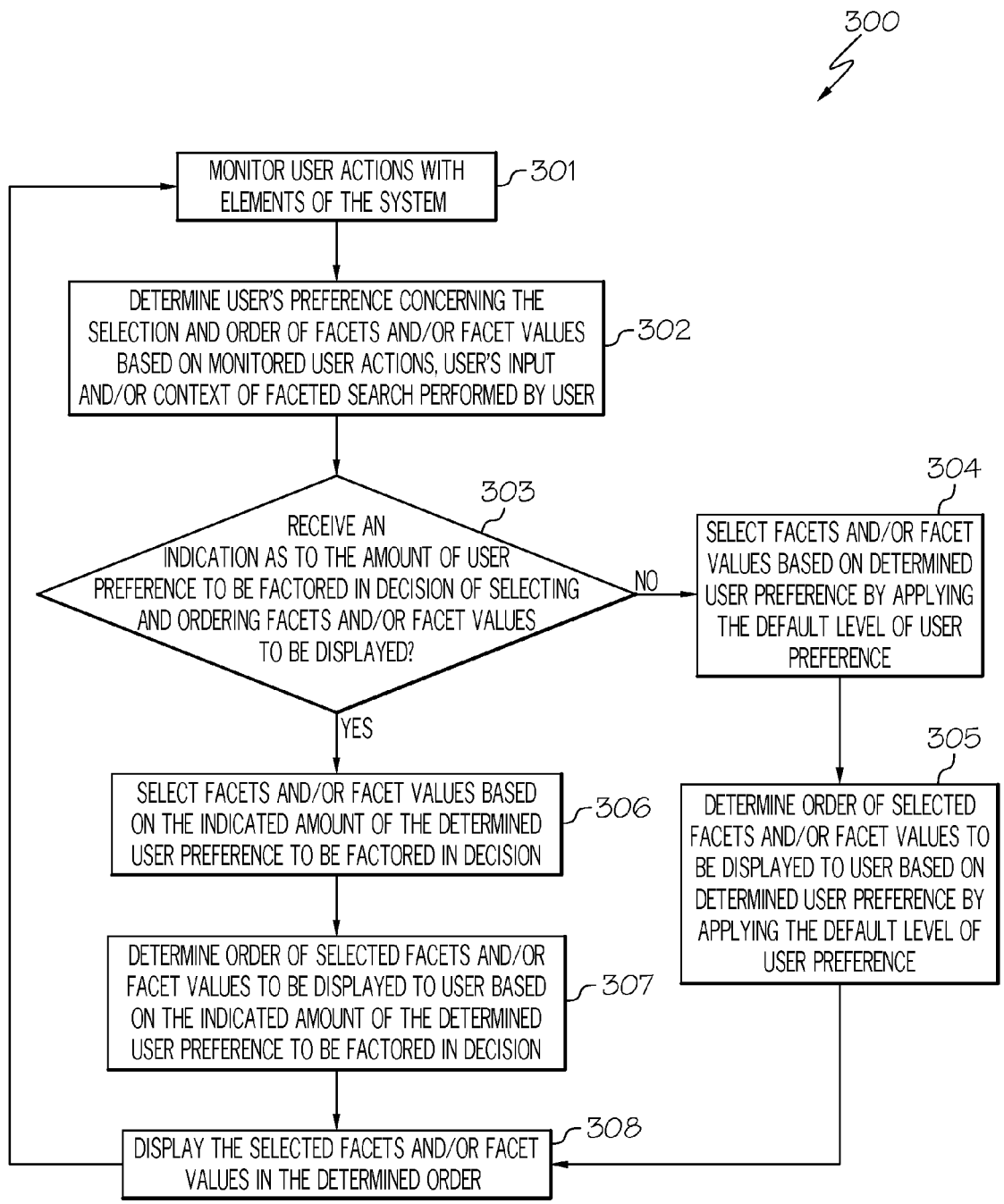
FIG. 3 is a flowchart of a method for selecting and ordering facets and/or facet values in a user interface dynamically based on user preference in accordance with an embodiment of the present invention.

The principles of the present invention provide a means for dynamically selecting and ordering facets and/or facet values to be presented to the user interface of client device 101 based on the determined "preference" of the user of client device 101 thereby providing the facets and/or facet values in the user interface the user desires to see resulting in a more relevant and insightful perspective on the data set as discussed below in connection with FIG. 3. FIG. 3 is a flowchart of a method for selecting and ordering facets and/or facet values in a user interface of client device 101 (FIG. 1) dynamically based on user preference in accordance with an embodiment of the present invention.

Referring to FIG. 3, in conjunction with FIGS. 1-2, in step 301, facet classification system 104 monitors the actions of a user of client device 101 with various elements of the system, such as the online activity of the user, the interactions with other people (e.g., interactions with other users of client devices 101), the interactions with documents, the interactions with data, etc. The information obtained from the monitored actions, such as the user's online searching, user's shopping characteristics (e.g., shopping for film cameras as opposed to digital cameras), purchase history, etc., may be stored in a user profile. The information stored in the user profile is not be limited to the examples described above but include any type of information that is used to determine which facets and/or facet values are to be displayed in the user interface of client device 101, including its particular order. For example, the user profile may include information pertaining to the selection/order of facets and/or facet values based on information directly inputted by the user ("user input"). For instance, the user may input the fact that the user prefers using a film camera versus a digital camera. As a result, when the user is searching for cameras on a vendor's website, the facets and/or facet values that should first be displayed should be targeted towards film cameras as opposed to digital cameras.

In step 302, facet classification system determines the user's preference concerning the selection and ordering of facets and/or facet values that the user desires to be displayed in the user interface based on the monitored actions of the user, the user's input, and/or context of the faceted search performed by the user (e.g., searching for cameras versus searching for albums). "Preference," as used herein, is directed to the goal of selecting the appropriate facets and/or facet values to be displayed in a particular order in the user interface of client device 101 that is desired by the user. That is, "user preference" refers to the preference of the user concerning the selection and ordering of the facets and/or facet values. As a result of displaying the appropriate facets and/or facet values in an order desired by the user, the user is provided a more relevant and insightful perspective on the data set as the user sees the "best" information more quickly while performing less work to see and apply the facets and/or facet values (e.g., the user does not have to perform as much scrolling to understand the facets and/or facet values displayed in the user interface). It is noted that the above examples of information (e.g., monitored actions, user's input) used to determine the user's preference are exemplary and that the principles of the present invention are not to be limited to such a list. The principles of the present invention are to include any information that may be used to determine a preference measure that results in the display of the appropriate facets and/or facet values in a particular order in the user interface of client device 101 that is desired by the user. Such information may be obtained from both outside the context of the user interface as well as within the context of the user interface.

Furthermore, the goal of displaying the appropriate facets and/or facet values in a particular order in the user interface of client device 101 that is desired by the user may be accomplished in various ways based on the user's preference. For example, if the user desires to see the "outlier" data set items, then the items that the user has infrequently or never encountered will be prominent in the user interface presentation. Additionally, in one embodiment, facet classification system 104 may identify facets and/or facet values of "possible interest" to the user based on the user's preference. For example, facet classification system 104 discovers that the user has viewed several types of lenses but has not expressed an interest in a particular type of lens. Facet classification system 104 may infer a possible interest in a particular type of lens based on the determined user's preference and present that type of lens, a type of outlier, to the user. In this manner, facet classification system 104 becomes more intelligent in determining which facets and/or facet values to be displayed in the user interface of client device 101 using the determined user's preference. Furthermore, the user's preference concerning the display of facets and/or facet values for one particular data set of items (e.g., a collection of books) could be defined in a different manner, including in a complete opposite manner, concerning the display of facets and/or facet values for another particular data set of items (e.g., a collection of songs). Furthermore, to be clear, the user's deemed "preference" may be used to select the appropriate facets and/or facet values to be displayed in the user interface thereby filtering the non-selected facets and/or facet values from being presented.

In step 303, a determination is made by facet classification system 104 as to whether it received an indication as to the amount of user preference to be factored in the decision of selecting and ordering facets and/or facet values to be displayed in the user interface of client device 101. For example, in one embodiment, the user may control the amount of user preference to be factored in the decision of selecting and ordering facets and/or facet values to be displayed in the user interface of client device 101, such as via knobs and/or sliders. For instance, the user may adjust the threshold level of "importance" or "preference" (i.e., adjust the threshold level of the performance measure) that is to be used in selecting and ordering facets and/or facet values. In another example, in one embodiment, the user may control the number of facets and/or facet values to be displayed in the user interface of client device 101, such as via knobs and/or sliders. For instance, the user may indicate a fewer number of facets to be displayed in the user interface than previously presented.

If facet classification system 104 does not receive an indication as to the amount of user preference to be factored in the decision of selecting and ordering facets and/or facet values to be displayed in the user interface of client device 101, then, in step 304, facet classification system 104 selects the facets and/or facet values based on the determined user preference by applying the default level of user preference in rendering such a decision. In step 305, facet classification system 104 determines the order of the selected facets and/or facet values based on the determined user preference by applying the default level of user preference in rendering such a decision.

For example, in the context of online shopping, the user seeks to purchase a new camera. At the vendor's website, the user navigates to the camera department and sees links for various facets, including brands, digital cameras, camcorders, etc. The website developer has decided which facets are the most important and presents them ahead of the deemed "less important" facets. Within each facet, the developer lists the valid facet values alphabetically/numerically. If the developer decided which facets are to be listed first based on the popularity of customer choices, then the brand or type facets of digital cameras may be listed first. However, such a popularity of customer choices may not match what is important to the particular user in question. For example, the user may prefer to use a 35 mm film camera. As discussed above, such preference may be determined in many ways. For instance, the user's purchase history may indicate a preference for using a 35 mm film camera. Because of the popularity of digital cameras, film cameras may not even be visible in the user interface. By contrast, if the facets and/or facet values were selected and ordered based on the user's preference, then film cameras would be listed first. By tailoring the selection and ordering of the facets and/or facet values in the user interface of client device 101 to what is important or preferred to the user, the user has a quicker, more logical and more satisfying shopping experience.

In another example, in the context of a social media environment, the user is browsing an activity stream to become aware of the activity among the user's business colleagues. Facets for the stream data include author, date/time, action, name, type, location and tags. In standard interfaces, the user may see facets, such as tags and date/time so that the user can filter the activity stream for items with a particular tag or within a particular time period (e.g., past week). However, using the principles of the present invention, the user's propensity for following links to files that the user's business colleagues have shared will cause the actions facet to be placed at the top of the facets and the "share" action to be listed as the first value within that facet. Such a "preference" or "importance" may be discovered by monitoring the user's online activity. As a result, the user can filter the activity stream to only view the files shared. Consequently, the tailoring of the user interface to what is important to the user's work activity provides a more efficient and satisfying work experience.

Referring to step 303, if, however, facet classification system 104 receives an indication as to the amount of user preference to be factored in the decision of selecting and ordering facets and/or facet values to be displayed in the user interface of client device 101, then, in step 306, facet classification system 104 selects the facets and/or facet values based on the indicated amount of the determined user preference to be factored in such a decision. In step 307, facet classification system 104 determines the order of the selected facets and/or facet values to be displayed in the user interface of client device 101 based on the indicated amount of the determined user preference to be factored in such a decision. In one embodiment, the number of facets and/or facet values that are displayed in the user interface of client device 101 may be based on the indicated number of facets and/or facet values to be displayed in the user interface of client device 101 provided by the user.

Upon determining the order of the selected facets and/or facet values to be displayed in the user interface of client device 101 in steps 305, 307, facet classification system 104, in step 308, displays the selected facets and/or facet values in the user interface of client device 101 in the determined order.

Upon displaying the facets and/or facet values in the user interface of client device 101, facet classification system 104 continues to monitor the actions of the user in step 301. By continuously monitoring the actions of the user as well as monitoring the updates/changes to other information used to determine the user's preference (e.g., changes in purchase history, changes in user input, changes in the context of the faceted search performed by the user), the "preference" of the user can be dynamically updated. By dynamically modifying the "preference" of the user, the display of the facets and/or facet values in the user interface of client device 101 can be dynamically updated based on the modified user preference thereby continuously providing a display of facets and/or facet values in the user interface of client device 101 that is commensurate with the facets and/or facet values that are desired by the user to see. While the foregoing discusses updating the user's preference in real-time, it is noted that the user's preference may be updated periodically or at a user-selected interval (e.g., once per week).

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for dynamically selecting and ordering facets and facet values in a user interface, the computer program product comprising the programming instructions for:

monitoring actions of a user comprising the following: online activity, interactions with other people, interactions with documents and interactions with data, wherein information obtained from said monitored actions is stored in a user profile;

determining a preference of a user concerning a selection and order of facets and facet values to be displayed in a user interface based on said information obtained from said monitored actions and context of a faceted search performed by said user;

selecting facets and facet values by applying a user designated amount of said determined preference of said user in response to receiving an indication from said user of an amount of said user preference to be factored in decision of selecting and ordering of said facets and facet values to be displayed in said user interface, wherein said indication corresponds to a number of said facets and facet values to be displayed in said user interface or corresponds to a threshold level of importance that determines whether a facet and a facet value is displayed in said user interface;

determining an order of said selected facets and facet values to be displayed in said user interface by applying said user designated amount of said determined preference of said user in response to receiving said indication from said user of said amount of said user preference to be factored in decision of selecting and ordering of said facets and facet values to be displayed in said user interface; and displaying said selected facets and facet values in said user interface in said determined order.

2. The computer program product as recited in claim 1, wherein said preference of said user is dynamically modified based on continuous monitoring of said actions of said user and monitoring updates or changes to information obtained from said monitored actions.

3. The computer program product as recited in claim 1, wherein said preference of said user is dynamically modified based on one or more of the following: changes in purchase history, changes in user's input and changes in context of faceted search performed by said user.

4. The computer program product as recited in claim 1 further comprising the programming instructions for:

selecting said facets and facet values based on said determined preference of said user by applying a default level of said user preference in response to not receiving said indication from said user of said amount of said user preference to be factored in decision of selecting and ordering of said facets and facet values; and determining said order of said selected facets and facet values to be displayed in said user interface by applying said default level of said user preference in response to not receiving said indication from said user of said amount of said user preference to be factored in decision of selecting and ordering of said facets and facet values.

5. A system, comprising:

a memory unit for storing a computer program for dynamically selecting and ordering facets and facet values in a user interface; and a processor coupled to said memory unit, wherein said processor, responsive to said computer program, comprises:

circuitry for monitoring actions of a user comprising the following: online activity, interactions with other people, interactions with documents and interactions with data, wherein information obtained from said monitored actions is stored in a user profile;

circuitry for determining a preference of a user concerning a selection and order of facets and facet values to be displayed in a user interface based on said information obtained from said monitored actions and context of a faceted search performed by said user;

circuitry for selecting facets and facet values by applying a user designated amount of said determined preference of said user in response to receiving an indication from said user of an amount of said user preference to be factored in decision of selecting and ordering of said facets and facet values to be displayed in said user interface, wherein said indication corresponds to a number of said facets and facet values to be displayed in said user interface or corresponds to a threshold level of importance that determines whether a facet and a facet value is displayed in said user interface;

circuitry for determining an order of said selected facets and facet values to be displayed in said user interface by applying said user designated amount of said determined preference of said user in response to receiving said indication from said user of said amount of said user preference to be factored in decision of selecting and ordering of said facets and facet values to be displayed in said user interface; and circuitry for displaying said selected facets and facet values in said user interface in said determined order.

6. The system as recited in claim 5, wherein said preference of said user is dynamically modified based on continuous monitoring of said actions of said user and monitoring updates or changes to information obtained from said monitored actions.

7. The system as recited in claim 5, wherein said preference of said user is dynamically modified based on one or more of the following: changes in purchase history, changes in user's input and changes in context of faceted search performed by said user.

8. The system as recited in claim 5, wherein said processor further comprises:

circuitry for selecting said facets and facet values based on said determined preference of said user by applying a default level of said user preference in response to not receiving said indication from said user of said amount of said user preference to be factored in decision of selecting and ordering of said facets and facet values; and circuitry for determining said order of said selected facets and facet values to be displayed in said user interface by applying said default level of said user preference in response to not receiving said indication from said user of said amount of said user preference to be factored in decision of selecting and ordering of said facets and facet values.

\* \* \* \* \*